US011077863B2

(12) United States Patent
Nemec et al.

(10) Patent No.: US 11,077,863 B2
(45) Date of Patent: Aug. 3, 2021

(54) SECONDARY DISENGAGE ALERT FOR AUTONOMOUS VEHICLES

(71) Applicant: Waymo LLC, Mountain View, CA (US)

(72) Inventors: Philip Nemec, San Jose, CA (US); Keith Hutchings, San Jose, CA (US); Julien Mercay, Redwood City, CA (US); Annissa Al-Alusi, San Mateo, CA (US); Saswat Panigrahi, Mountain View, CA (US); Cristi Landy, Sunnyvale, CA (US); Matthew Schwall, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/599,693

(22) Filed: Oct. 11, 2019

(65) Prior Publication Data

US 2021/0046946 A1    Feb. 18, 2021

Related U.S. Application Data

(60) Provisional application No. 62/886,475, filed on Aug. 14, 2019.

(51) Int. Cl.
| | |
|---|---|
| *B60W 50/10* | (2012.01) |
| *B60W 50/14* | (2020.01) |
| *G05D 1/00* | (2006.01) |
| *B60W 40/105* | (2012.01) |
| *B60W 50/00* | (2006.01) |

(52) U.S. Cl.
CPC .......... *B60W 50/10* (2013.01); *B60W 40/105* (2013.01); *B60W 50/14* (2013.01); *G05D 1/0061* (2013.01); *G05D 1/0088* (2013.01); *B60W 2050/0073* (2013.01); *B60W 2050/146* (2013.01); *G05D 2201/0213* (2013.01)

(58) Field of Classification Search
CPC .... B60W 50/10; B60W 40/105; B60W 50/14; B60W 2050/0073; B60W 2050/146; G05D 1/0061; G05D 1/0088; G05D 2201/0213
See application file for complete search history.

(56) References Cited

U.S. PATENT DOCUMENTS

| | | | | |
|---|---|---|---|---|
| 2014/0156133 | A1* | 6/2014 | Cullinane | B60R 22/48 701/23 |
| 2014/0172221 | A1* | 6/2014 | Solyom | G08G 1/167 701/23 |

(Continued)

*Primary Examiner* — Thomas D Alunkal
(74) *Attorney, Agent, or Firm* — Botos Churchill IP Law

(57) ABSTRACT

Aspects of the disclosure provide for determining when to provide and providing secondary disengage alerts for a vehicle having autonomous and manual driving modes. For instance, while the vehicle is being controlled in the autonomous driving mode, receiving user input at one or more using input devices of the vehicle. In response to receiving the user input, the vehicle may be transitioned from the autonomous driving mode to a manual driving mode and provide a primary disengage alert to an occupant of the vehicle regarding the transition. Whether to provide a secondary disengage alert may be determined based on at least circumstances of the user input. After the transition, the secondary disengage alert may be provided based on the determination.

25 Claims, 4 Drawing Sheets

(56) References Cited

U.S. PATENT DOCUMENTS

| | | | |
|---|---|---|---|
| 2014/0303827 A1* | 10/2014 | Dolgov | B60W 30/00 |
| | | | 701/23 |
| 2015/0268665 A1* | 9/2015 | Ludwick | B60Q 5/008 |
| | | | 701/23 |
| 2016/0325757 A1* | 11/2016 | Westlund | G05D 1/0061 |
| 2017/0106876 A1* | 4/2017 | Gordon | B60W 30/182 |
| 2018/0154899 A1* | 6/2018 | Tiwari | B60W 60/0011 |
| 2018/0326992 A1* | 11/2018 | Aoi | B60W 50/14 |
| 2019/0011914 A1 | 1/2019 | Park et al. | |
| 2019/0016346 A1 | 1/2019 | Park et al. | |
| 2019/0025823 A1* | 1/2019 | Christiansen | B62D 15/029 |
| 2019/0204827 A1 | 7/2019 | Bhalla et al. | |
| 2019/0278268 A1* | 9/2019 | Rezaeian | B60W 60/0053 |

* cited by examiner

SECONDARY DISENGAGE ALERT FOR AUTONOMOUS VEHICLES

CROSS REFERENCE TO RELATED APPLICATION

This application claims the benefit of the filing date of U.S. Provisional Patent Application No. 62/886,475 filed Aug. 14, 2019, the disclosure of which is hereby incorporated herein by reference.

BACKGROUND

Autonomous vehicles, such as vehicles which do not require a human driver when operating in an autonomous driving mode, may be used to aid in the transport of passengers or items from one location to another. Autonomous vehicles, such as vehicles which do not require a human driver, may be used to aid in the transport of passengers or items from one location to another. In some instances, these vehicles may need to change from the autonomous driving mode, where the vehicle's computing devices control the steering, acceleration and deceleration of the vehicle to a semiautonomous driving mode, where there is shared control between of the vehicle (e.g. the driver may control the steering of the vehicle via a steering input while the vehicle's computing devices control the acceleration and deceleration of the vehicle), or to a manual driving mode where a driver controls the steering, acceleration and deceleration of the vehicle via steering, acceleration, and deceleration inputs.

SUMMARY

Figure 1:
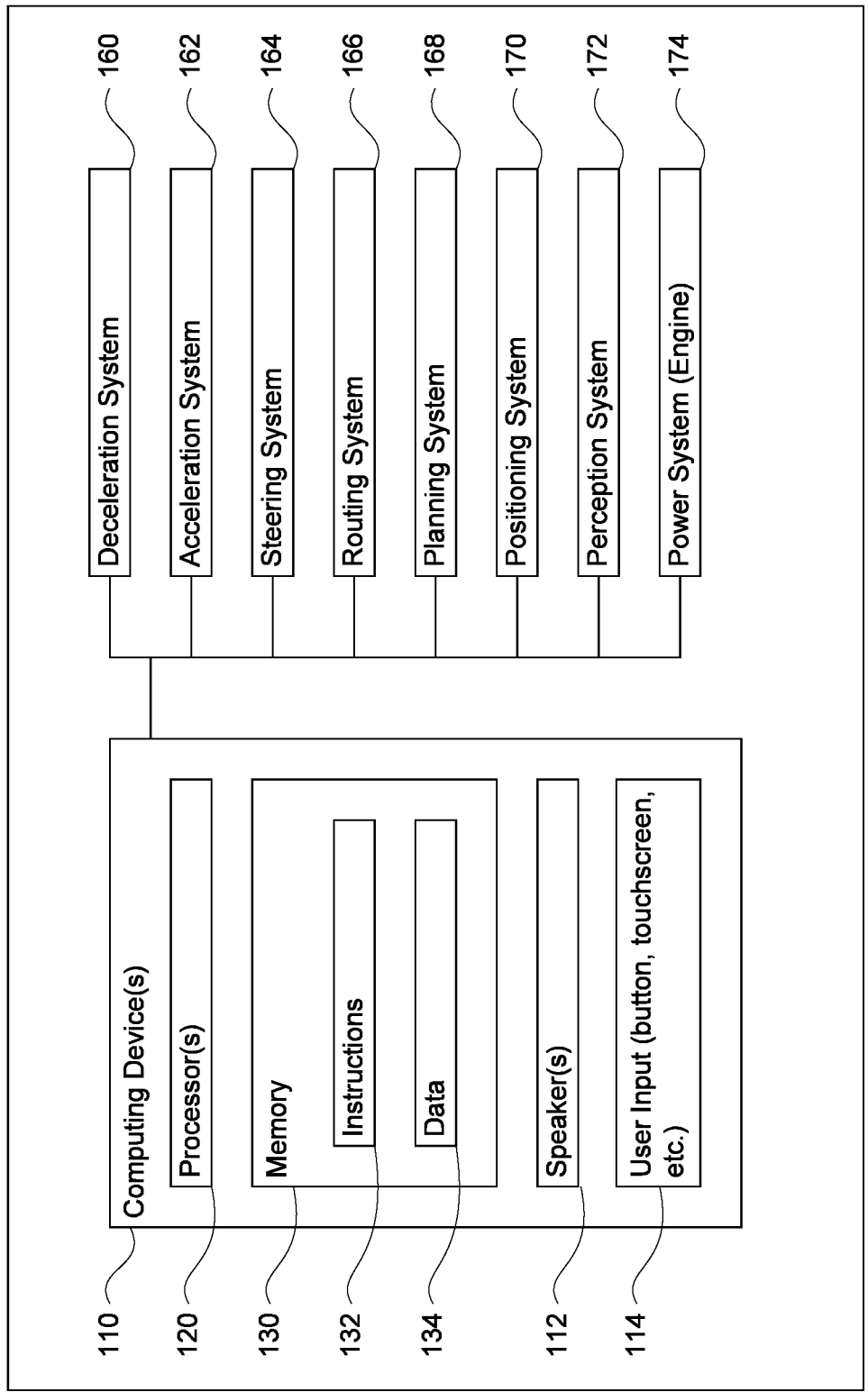
FIG. 1 is a functional diagram of an example vehicle in accordance with an exemplary embodiment.

One aspect of the disclosure provides a method of determining when to provide and providing secondary disengage alerts for a vehicle having autonomous and manual driving modes. The method includes, while the vehicle is being controlled in the autonomous driving mode, receiving, by one or more processors, user input at one or more using input devices of the vehicle; in response to receiving the user input, transitioning, by the one or more processors, the vehicle from the autonomous driving mode to a manual driving mode and providing a primary disengage alert to an occupant of the vehicle regarding the transition; determining, by the one or more processors, whether to provide a secondary disengage alert based on at least circumstances of the user input; and after the transition, providing, by the one or more processors, the secondary disengage alert based on the determination.

In one example, the circumstances of the user input relate to a type of a user input device at which the user input was received. In this example, when the type of the user input device is a button that causes the vehicle to transition to the manual driving mode, determining whether to provide the secondary disengage alert includes determining not to provide the secondary disengage alert. Alternatively, when the type of the user input device is one of a brake pedal and accelerator, determining whether to provide the secondary disengage alert based on at least the circumstances of the user input also includes determining whether the user input meets a predetermined force threshold. Alternatively, when the type of the user input device is a steering wheel, determining whether to provide a secondary disengage alert based on at least the circumstances of the user input may also include determining whether the user input meets a predetermined torque threshold. In another example, determining whether to provide a secondary disengage alert based on at least the circumstances of the user input may also include determining whether the user input meets a predetermined torque for at least a predetermined duration.

In another example, determining whether to provide a secondary disengage alert is further based on whether there has been additional user input within a period of time from the user input or the transition. In this example, the additional user input is a control input at one or more of a steering wheel, brake pedal, or accelerator of the vehicle. Alternatively, the additional user input is a non-control input at one or more user inputs of the vehicle other than a steering wheel, brake pedal, or accelerator of the vehicle. Alternatively, when there has been no control input at one or more of a steering wheel, brake pedal, or accelerator of the vehicle and no non-control input at one or more user inputs of the vehicle other than a steering wheel, brake pedal or accelerator of the vehicle within the period of time, determining whether to provide the secondary disengage alert includes determining to provide the secondary disengage alert. Alternatively, when the additional input includes control input at one or more of a steering wheel, brake pedal or accelerator of the vehicle and no non-control input at one or more user inputs of the vehicle other than a steering wheel, brake pedal or accelerator of the vehicle, determining whether to provide the secondary disengage alert includes determining to provide the secondary disengage alert. Alternatively, when the additional input includes control input at one or more of a steering wheel, brake pedal or accelerator of the vehicle and non-control input at one or more user inputs of the vehicle other than a steering wheel, brake pedal or accelerator of the vehicle, determining whether to provide the secondary disengage alert includes determining not to provide the secondary disengage alert. In addition or alternatively, the method also includes determining the period of time based on a current speed of the vehicle. In this example, when the current speed is a first speed, the period of time is less than when the current speed is a second speed less than the first speed.

In another example, determining whether to provide a secondary disengage alert is further based on whether a predetermined period of time has lapsed since the autonomous driving mode was engaged. In this example, when the predetermined period of time has lapsed since the autonomous driving mode was engaged, determining whether to provide the secondary disengage alert includes determining to provide the secondary disengage alert. In another example, determining whether to provide a secondary disengage alert is further based on whether a predetermined period of time has lapsed since non-control input was received at one or more user inputs of the vehicle other than a steering wheel, brake pedal or accelerator of the vehicle. In another example, the method also includes disabling the secondary disengage alert based on whether there is a second occupant in the vehicle.

Another aspect of the disclosure provides a system for determining when to provide and providing secondary disengage alerts for a vehicle having autonomous and manual driving modes. The system includes one or more processors configured to: while the vehicle is being controlled in the autonomous driving mode, receive user input at one or more using input devices of the vehicle; in response to receiving the user input, transition the vehicle from the autonomous driving mode to a manual driving mode and providing a primary disengage alert to an occupant of the vehicle regarding the transition; determine whether to provide a secondary disengage alert based on at least circumstances of the user input; and after the transition, provide the secondary disengage alert based on the determination.

In one example, the one or more processors are configured to determine whether to provide the secondary disengage alert further based on whether there has been additional user input within a period of time from the user input or the transition. In another example, the one or more processors are configured to determine whether to provide the secondary disengage alert further based on whether a predetermined period of time has lapsed since the autonomous driving mode was engaged.

DETAILED DESCRIPTION

Overview

The technology relates to alerting an occupant of a vehicle (passenger, driver, etc.) when a vehicle has changed from an autonomous driving mode to a semiautonomous or a manual driving mode (where the occupant needs to control some aspect of steering, braking, acceleration, etc.). A vehicle may change from an autonomous driving mode to a semiautonomous or manual driving mode for various reasons, such as a steering wheel torque, brake pedal or accelerator pedal input, press of a button (where the button is specifically designed to cause the transition), software triggers (such as where there is a hardware or software fault), etc.

When such events occur, the vehicle's computing system may automatically provide an initial alert to the occupant in addition to any visual indication of the driving mode. This alert may start the moment that the vehicle disengages from the autonomous driving mode (e.g. into the semiautonomous or manual driving mode) and may include a chime or other audible noise as well as an audible message or phrase to indicate to the passenger that the vehicle has transitioned, is transitioning, or will transition to the semiautonomous or manual driving mode.

However, in some cases, the user input may have been unintentional, such as an occupant bumping the steering wheel or tapping the accelerator by mistake. For instance, if the vehicle hits a large pothole, this may cause the occupant to be jostled around and possibly tap the brake pedal or accelerator and/or steering wheel. In such circumstances, it may be critical to provide the occupant with an additional or secondary disengage alert in order to ensure that the occupant understands that the transition has occurred. This secondary disengage alert may be louder and/or more forceful in order to get the attention of the occupant. The secondary disengage alert may enable the occupant to take control of the vehicle in the semiautonomous or manual driving mode and/or to re-engage the autonomous driving mode if the transition was unintentional. At the same time, in circumstances where the disengage was intentional and there is an emergent situation (e.g. the occupant took control of the vehicle in order to avoid hitting another object or disobeying a traffic law, etc.), it may be alarming and distracting to the occupant to hear another alert. Therefore it is important to balance the need for the secondary disengage alert with its practical use.

In some instances, the circumstances which caused the disengage may be used to determine whether the disengage was intentional and therefore whether to provide the secondary disengage alert or not. In addition or alternatively, the duration or time during which the input was made may be considered when determining whether the disengage was intentional and therefore whether to provide the secondary disengage alert or not. In addition, the vehicle's computing devices may determine whether there has been some additional input before or after the transition. This may suggest whether the disengage was intentional and may also be used by the computing devices to determine whether to provide the secondary disengage alert or not.

In other instances, determining whether to provide a secondary disengage alert may be based on whether a predetermined period of time has lapsed since the last non-control input was received at one or more user inputs of the vehicle other than a steering wheel, brake pedal or accelerator of the vehicle. In some instances, despite having an additional control input and/or non-control input as described above, it may be very unlikely that the occupant would have intentionally disengaged. In such cases, even where there is a control input, the computing devices may provide the secondary disengage alert.

The features described herein may allow a vehicle's computing devices to ensure that an occupant of the vehicle is paying attention and takes control of the vehicle when the vehicle switches from an autonomous driving mode to a semiautonomous or a manual driving mode. As noted above, while it is certainly possible to always provide a primary disengage alert and a secondary disengage alert in such instances, it may not always be helpful to the occupant and may even make a dangerous situation worse. In addition, the use of an additional, secondary disengage alert, which is of a different type and/or higher magnitude than the initial, primary disengage alert, may also allow for the use of a primary disengage alert that is less cognitive loading, and therefore less likely to cognitively overload an occupant of the vehicle. Due to the secondary disengage alert's more specific triggering criteria, the secondary disengage alerts can be made to be more alerting, mitigating the consequences of rare but important accidental disengages without risking the task overload that may occur if a primary disengage alert were as salient or alerting.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or a linear resonant actuator placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semiautonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 2:
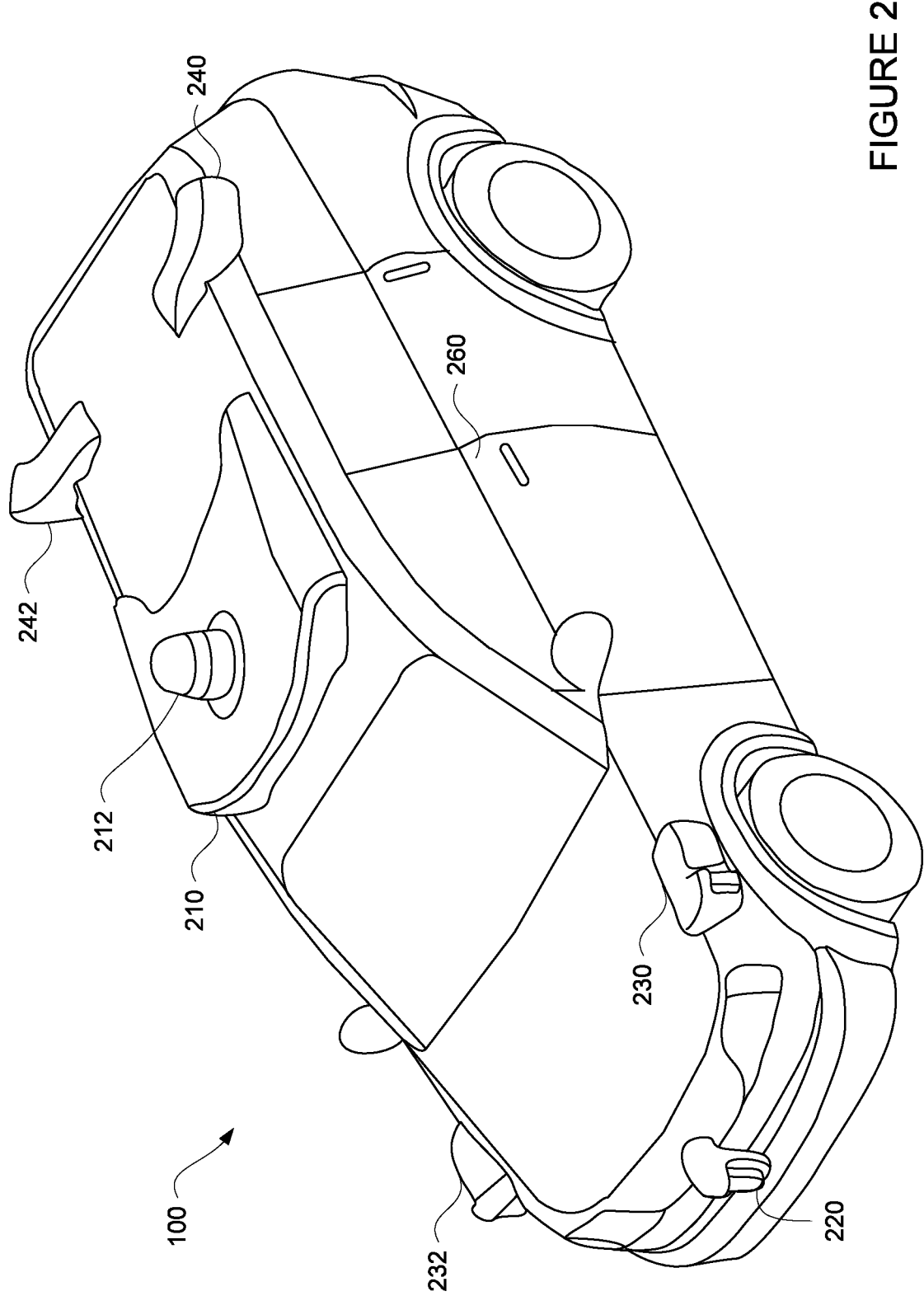
FIG. 2 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
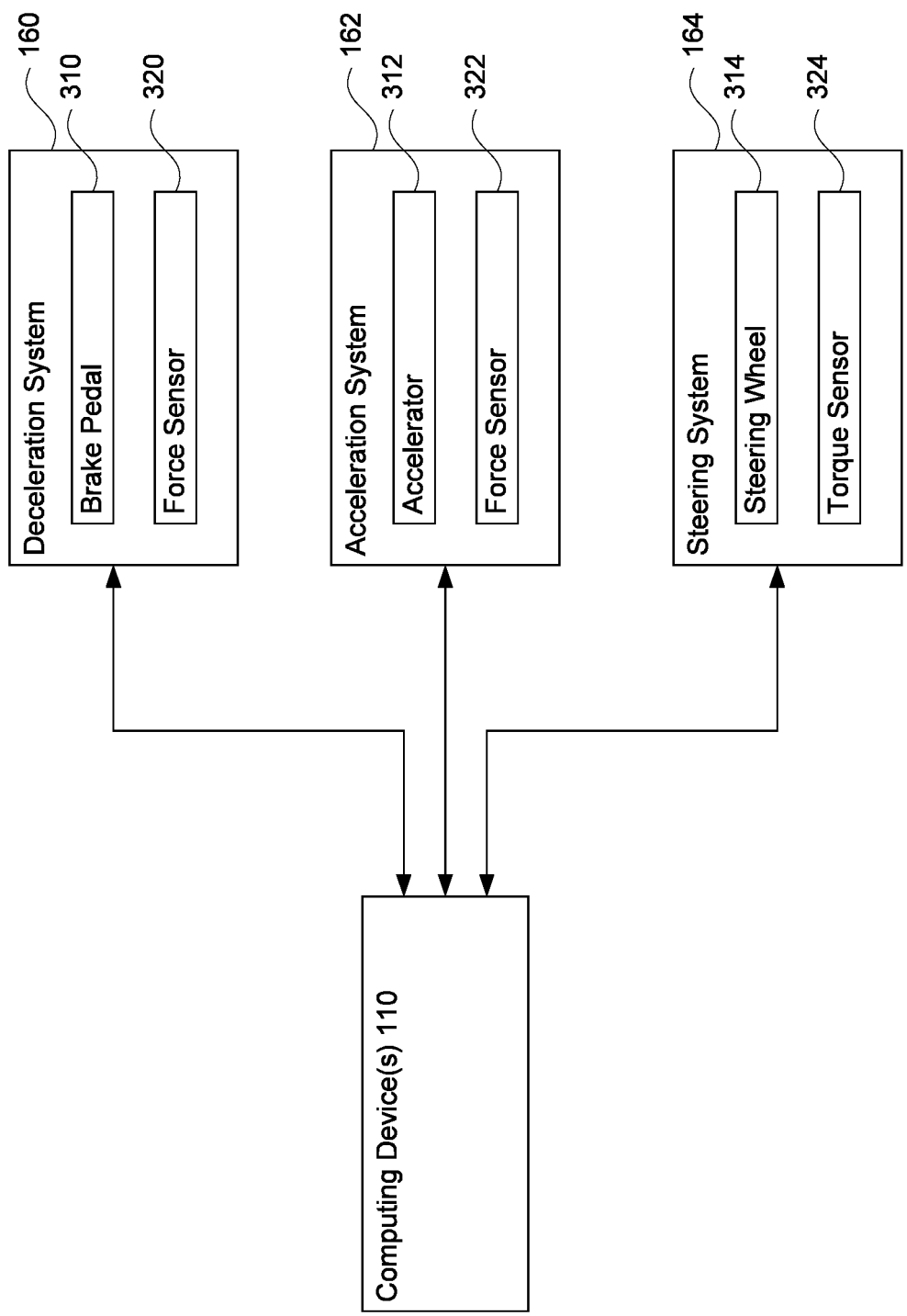
FIG. 3 is an example diagram of various vehicle systems in accordance with aspects of the disclosure.

FIG. 3 provides additional details for various vehicle systems. For instance, as noted above, the computing devices 110 may communicate with the deceleration system 160, acceleration system 162, and steering system 164. Each of these systems may include a corresponding user input, such as brake pedal 310 of deceleration system 160, accelerator 312 (e.g. an accelerator pedal or gas pedal) of the acceleration system 162, and a steering wheel 314 of the steering system 164. Input to these devices may be measured via various sensors including force sensor 320 of deceleration system, force sensor 322 of acceleration system 162, and torque sensor 332 of steering system 164. In this regard, force sensor 320 may measure the force of an input at the brake pedal 310. This force sensor may provide feedback directly to the computing devices 110 or indirectly, for instance, to a computing device of the deceleration system which thereafter provides the feedback to the computing devices 110. Similarly, force sensor 322 may measure the force of an input at the accelerator 312. This force sensor may provide feedback directly to the computing devices 110 or indirectly, for instance, to a computing device of the acceleration system which thereafter provides the feedback to the computing devices 110. In addition, the torque sensor 324 may measure the force of an input at the steering wheel 314. This torque sensor may provide feedback directly to the computing devices 110 or indirectly, for instance, to a computing device of the steering system which thereafter provides the feedback to the computing devices 110.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
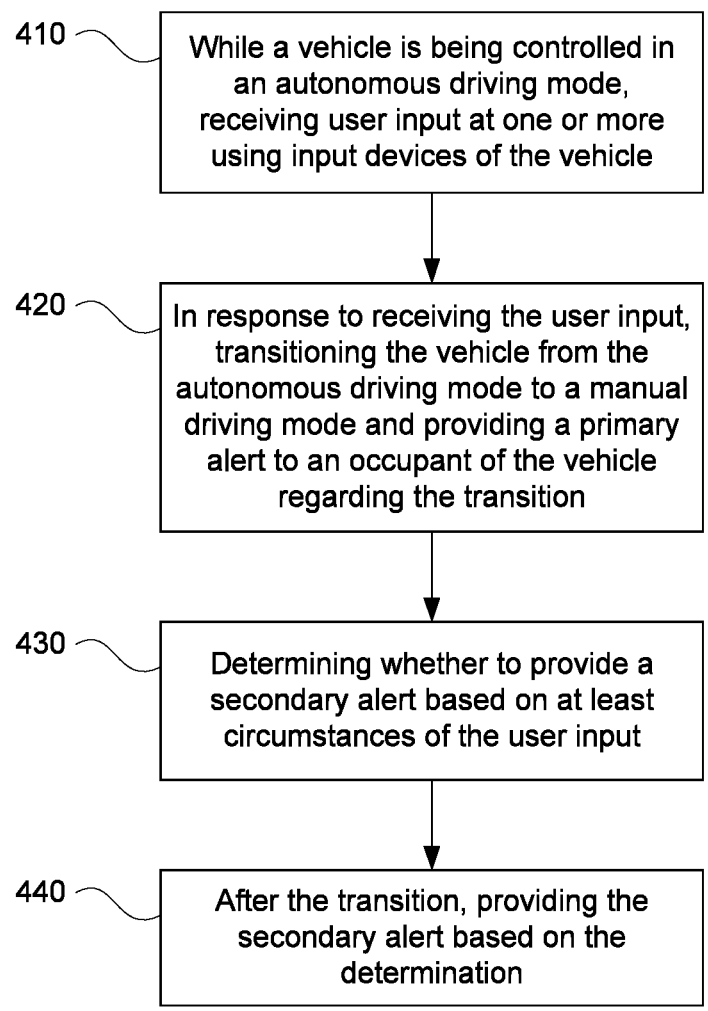
FIG. 4 is an example flow diagram in accordance with aspects of the disclosure.

FIG. 4 provides an example flow diagram 400 for determining when to provide and providing secondary disengage alerts for a vehicle having autonomous and manual driving modes. For instance, as shown in block 410, while the vehicle is being controlled in the autonomous driving mode, user input is received at one or more using input devices of the vehicle. For example, such user input may include a steering wheel movement at the steering wheel 314, brake pedal input at the brake pedal 310, accelerator pedal input at the accelerator 312, press of a button or touch screen corresponding to the user input device 114. Feedback from these devices may be sent to and received by the computing devices 110.

At block 420, in response to receiving the user input, the vehicle is transitioned from the autonomous driving mode to a manual driving mode. In addition, a primary disengage alert to an occupant of the vehicle regarding the transition. For example, in response to receiving sufficient user input at one of the steering wheel 314, brake pedal 310, accelerator 312, or user input device 114, the computing devices may transition the vehicle from the autonomous driving mode to the manual driving mode. For instance, in response to user input sufficient to cease autonomous driving mode, all autonomous function ceases, including control of acceleration, deceleration, steering, etc., with the exception of critical safety systems inherent in the vehicle platform, such as automatic emergency braking which may or may not be controlled by the computing devices 110.

At this point it is critical for an occupant of the vehicle (e.g. a driver) to take control of the manual controls, or at least to begin to pay attention and utilize or otherwise actively control the steering, acceleration and/or deceleration of the vehicle 100 via the steering wheel 314, brake pedal 310, and/or accelerator 312. As such, a primary disengage alert may be provided to the driver by the computing devices 110 via the speakers 112 and/or a vibration device. This primary disengage alert may start the moment that the vehicle disengages from the autonomous driving mode (e.g. into the semiautonomous or manual driving mode) and may include a chime or other audible noise as well as an audible message or phrase to indicate to the passenger that the vehicle has transitioned, is transitioning, or will transition to the semiautonomous driving mode or manual driving mode. Because the primary disengage alert is audible, it may be better able to grab the attention of the driver as compared to a purely visual alert which may only grab the attention of the driver if he or she is looking at the device providing the visual alert. However, the primary disengage alert may also include visual information, for instance, provided on a touch screen of user input device 114 of some other display device of the vehicle 100.

At block 430, whether to provide a secondary disengage alert based on at least circumstances of the user input is determined. For instance, in some cases, the user input may have been unintentional, such as an occupant bumping the steering wheel or tapping the accelerator by mistake. For example, if the vehicle hits a large pothole, this may cause the occupant to be jostled around and possibly tap the brake pedal or accelerator and/or steering wheel. In such circumstances, it may be critical to provide the occupant with an additional or secondary disengage alert in order to ensure that the occupant understands that the transition has occurred. In this regard, at block 440, after the transition, the secondary disengage alert is provided based on the determination.

This secondary disengage alert may be provided via the speakers 112 and/or vibration device. The secondary disengage alert may be louder and/or more forceful in order to get the attention of an occupant of the vehicle. The secondary disengage alert may enable the occupant to take control of the vehicle in the semiautonomous or manual driving mode and/or to re-engage the autonomous driving mode if the transition was unintentional. At the same time, in circumstances where the disengage was intentional and there is an emergent situation (e.g. the occupant took control of the vehicle in order to avoid hitting another object or disobeying a traffic law, etc.), it may be alarming and distracting to the occupant to hear another alert. Therefore it is important to balance the need for the alert with its practical use.

In this regard, the circumstances which caused the disengage (or as shown in FIG. 4, the circumstances of the user input which caused the disengage), may be used to determine whether the disengage was likely intentional and therefore whether to provide the secondary disengage alert or not. For example, if the disengage was caused by pressing a button of the user input device 114 that may be difficult to press by mistake (for instance, because of the button's location or configuration), this alone may be sufficient to determine that the disengage was intentional, and therefore the computing devices would not provide the secondary disengage alert.

As another example, if the disengage was caused by input at the brake pedal 310 that meets a predetermined force threshold, the computing devices 110 would not provide the secondary disengage alert. For example, the computing devices 110 may receive feedback from the force sensor 320, and may compare this feedback to a predetermined force threshold. If the feedback does not meet or is less than the predetermined force threshold, this may indicate that the disengage was unintentional (i.e. accidental), and as such, the computing devices 110 may provide the secondary disengage alert. If the feedback meets or is greater than the predetermined force threshold this may indicate that the disengage was intentional and as such, the computing devices 110 would not provide the secondary disengage alert. In this regard, the memory 130 may store a predetermined force threshold for the brake pedal 310. This predetermined force threshold may be determined through testing and may be adjusted as needed. Of course, this predetermined force input may be greater than or equal to a force threshold required to cause the vehicle to transition from the autonomous driving mode to the semiautonomous driving mode or manual driving mode.

As another example, if the disengage was caused by input at the accelerator 312 that meets a predetermined force threshold, the computing devices 110 would not provide the secondary disengage alert. For example, the computing devices 110 may receive feedback from the force sensor 322, and may compare this feedback to a predetermined force threshold. If the feedback does not meet or is less than the predetermined force threshold, this may indicate that the disengage was unintentional (i.e. accidental), and as such, the computing devices 110 may provide the secondary disengage alert. If the feedback meets or is greater than the predetermined force threshold this may indicate that the disengage was intentional and as such, the computing devices 110 would not provide the secondary disengage alert. In this regard, the memory 130 may store a predetermined force threshold for the accelerator 312. This predetermined force threshold may be determined through testing and may be adjusted as needed. Of course, this predetermined force input may be greater than or equal to a force threshold required to cause the vehicle to transition from the autonomous driving mode to the semiautonomous driving mode or manual driving mode.

Similarly, if the disengage was caused by input at the steering wheel 314 that meets a predetermined torque threshold, the computing devices would not provide the secondary disengage alert. For example, the computing devices 110 may receive feedback from the torque sensor 324 and may compare this feedback to a predetermined torque threshold. If the feedback does not meet or is less than the predetermined torque threshold, this may indicate that the disengage was unintentional (i.e. accidental), and as such, the computing devices 110 may provide the secondary disengage alert. If the feedback meets or is greater than the predetermined force threshold this may indicate that the disengage was intentional and as such, the computing devices 110 would not provide the secondary disengage alert. In this regard, the memory 130 may store a predetermined torque threshold for the steering wheel 314. This predetermined torque threshold may be determined through testing and may be adjusted as needed. Of course, this predetermined force input may be greater than or equal to a torque threshold required to cause the vehicle to transition from the autonomous driving mode to the semiautonomous driving mode or manual driving mode.

In addition or as an alternative to torque, an occupant's grip on the steering wheel (or other steering control such as a joystick) may be used to determine whether the input was intentional. For instance, the steering wheel may include a force sensor which detects force or grip on the steering wheel and provides this information to the computing devices 110. The computing devices 110 may then compare the feedback to a threshold value to determine whether the grip on the steering wheel is sufficient to indicate that the input was intentional. If so, the secondary disengage alert may not be provided. If not, the secondary disengage alert may be provided.

In addition, in some instances, the vehicle's computing devices may use the context in order to adjust the predetermined force and/or torque thresholds. For instance, the context may suggest that the user input was more or less likely to be intentional which can be used to decrease (when more likely) or increase (when less likely) the predetermined force and/or torque thresholds. In other words, the thresholds for a secondary disengage alert may be set in proportion to the probability of a control input (braking, steering, or acceleration) at that moment or a window of time, being intentional. This may help to reduce the likelihood that a secondary disengage alert occurs when the driver intentionally resumed manual driving. In this regard, the dynamic adjustment of the thresholds may help to balance the need for timely and prominent confirmation of disengage intention against the need to minimize the addition cognitive load a secondary disengage alert may cause to a driver.

The context may be historical (e.g. based on the map information used to control the vehicle) and/or may be based on sensor data generated by the perception system 172. For instance, historical data of a manually driven or autonomously driven fleet of vehicle can reveal the context for roads (e.g., intersection or highway) most predictive of intentional input, either by a driver or an autonomous vehicle. Other examples of context may include historical disengage patterns (i.e. prior transitions from autonomous driving mode to another driving mode at the same or similar locations for this or other vehicles in the past), road geometry such as curvature or potholes which may be detected in real time and/or determined from the map information, proximity to other vehicles, behavior of other vehicles (such as other vehicles making abrupt lane changes nearby the vehicle 100), etc.

For example, in situations in which the vehicle is in the near proximity of other vehicles or vulnerable road users (such as pedestrians or bicyclists), the probability of a control input being intentional may be more likely, and thus, in such contexts, the thresholds may be higher than in a situation in which there is no other vehicles or vulnerable road users. As another example, in a situation where the vehicle was on an open, straight road, the threshold for intentional braking may be higher than in more complex contexts (such as those with one or more bends in the road, with other vehicular or pedestrian traffic, etc.), because braking on an open road is more likely to have been accidental than in more complex contexts. As another example, when the vehicle 100 is in close proximity to another vehicle directly in front of the vehicle, input at the brake pedal of any intensity may have a high probability of being intentional, and thus, in such contexts, the thresholds may be lower than in a situation in which there is no other vehicle in front of the vehicle 100. As another example, if the vehicle 100 started to decelerate abruptly (i.e. a "hard" brake) and there is another vehicle immediately behind the vehicle 100, input at the accelerator may be more likely to be intentional, and thus, in such contexts, the thresholds may be lower than in a similar braking situation in which there is no other vehicle in immediately behind the vehicle 100. In addition or alternatively, the duration or time during which the input was made may be considered when determining whether the disengage was intentional and therefore whether to provide the secondary disengage alert or not. For instance, if the input at the brake pedal 310, accelerator 312, or steering wheel 314 was very brief as determined from feedback from the force sensor 320, then this may suggest that the input was accidental, and in such circumstances, even though one or more of the predetermined force and/or torque thresholds was met, the computing devices 110 may still provide the secondary disengage alert. Thus, the computing devices may also determine whether the input that meets the predetermined force and/or torque threshold occurred for at least a predetermined duration. One example of such a time-based predetermined force threshold may be an input at the brake pedal of at least 3 newton-metres of torque over 0.1 second. In this regard, the memory 130 may store time-based predetermined force and torque thresholds for each of the brake pedal 310, accelerator 312, and steering wheel 314. These time-based predetermined force or torque thresholds may be stored in the memory 130, determined through testing, and adjusted as needed.

In some instances, the state of an occupant of the vehicle, such as the driver, at or immediately before the input was made may be considered when determining whether the disengage was intentional and therefore whether to provide the secondary disengage alert or not. For instance, an internal still or video camera of the vehicle may capture images of the driver's eyes. Feedback from the camera may be sent to the computing devices 110 which may track the occupant's eye movements. For example, if the occupant's eyes recently focused on a close object, this may indicate that the input was intentional, and the computing devices 110 may not provide the secondary disengage alert.

In addition or alternatively, predetermined thresholds corresponding to a minimum change in deceleration, acceleration or heading of the vehicle 100 may be used to determine whether an input which caused a disengage was intentional or not. For example, an acceleration threshold may be 3 meters per second per second, and if the acceleration of the vehicle resulting from the input is less than this amount, this may indicate that the input was accidental or rather not intended. Similarly, a deceleration threshold may be 3 meters per second per second, and if the deceleration of the vehicle resulting from the input is less than this amount, this may indicate that the input was accidental or rather not intended. As another example, a heading threshold may be at or near 8.4 degrees, which is typical of intended merges, and if the changing heading of the vehicle resulting from the input is less than this amount, this may indicate that the input was accidental or rather not intended. Again, these predetermined thresholds may be stored in the memory 130, determined through testing, and adjusted as needed.

In still other examples, the vehicle's computing devices may determine whether there were specific types of more complex interactions with control inputs. Complex interactions may be defined either heuristically or statistically. For instance, heuristic definitions may rely on behavioral research demonstrating that sequences of unrelated, precise motor behavior infrequently occur in non-conscious states. Statistical definitions may utilize data collected by vehicles configured the same as or similarly to vehicle 100 while operating in a manual driving mode. This may provide patterns of interaction sequences with the brake pedal, accelerator and/or steering wheel indicative of intentional states or in other words, those of an aware, active driver. For example, a complex interaction may include steering one way and then the other or multiple presses of the brake pedal. As another example, where a driver has begun to lightly depress the brake pedal 312 and then subsequently began to lightly depress the accelerator 314, the braking intensity may be insufficient to prevent the secondary disengage alert by itself, but the additional accelerator input may increase the likelihood that the disengage was intentional and thereby not provide the secondary disengage alert. Again these complex interactions may be stored in the memory 130, determined through testing, and adjusted as needed.

In addition, the computing devices 110 may determine whether there has been some additional input before or after the transition. This may suggest whether the disengage was intentional and may also be used by the computing devices to determine whether to provide the secondary disengage alert or not. For example, the computing devices 110 may determine whether there was a control input by the occupant such as a button-press of user input device 114, brake pedal 310, accelerator 312, or steering wheel 314 (with specific thresholds for each, determined through testing) within a predetermined period of time since the disengage occurred or the initial input that caused the transition occurred. This predetermined period of time may be stored in the memory 130, determined through testing, and adjusted as needed.

In addition, the computing devices may determine whether there was some non-control input by the occupant. Examples of non-control inputs may include raising or lowering the windows, changing the air conditioning settings, etc. which do not have a direct effect on the deceleration, acceleration, or steering of the vehicle. If there was an additional control input and no non-control input, this may suggest that the user input was unintentional, and the computing devices 110 may provide the secondary disengage alert. If there was a non-control input and then control input, this may suggest that the user input was intentional, and the computing devices 110 may not provide the secondary disengage alert. If there was no additional control input and a non-control input, this may suggest that the user input was intentional, and the computing devices 110 may not provide the secondary disengage alert. If there was no additional control input and no non-control input, the computing devices 110 may provide the secondary disengage alert. In this regard, the non-control input may indicate or suggest that the occupant is paying attention.

The predetermined period of time should be brief, but reasonable given the typical reaction time of a human, such as 2.5 seconds, 5 seconds or more or less. In addition, because it may be more important for the occupant to take control more quickly when the vehicle is driving at faster speeds, the period of time may decrease as the speed of the vehicle increases. For example, when the vehicle is driving at speeds greater than 15 miles per hour, the period of time may be 2.5 seconds, and when the vehicle is driving at speeds at or below 15 miles per hour, the period of time may be 5 seconds. In this regard, if needed, the secondary disengage alert may be provided sooner if the vehicle is traveling at higher speeds than if the vehicle is traveling at lower speeds.

In other instances, determining whether to provide a secondary disengage alert may be based on whether a predetermined period of time has lapsed between the last non-control input was received at one or more user inputs of the vehicle other than a steering wheel, brake pedal or accelerator of the vehicle and the input that caused the disengage. For example, if the non-control input was less than the predetermined period of time from the input that caused the disengage, this may indicate that the user input was intentional (i.e. that the occupant was paying attention), and thus, the computing devices 110 would not provide the secondary disengage alert. If the input that caused the disengage was made more than the predetermined period of time after the last non-control input, this may indicate that the input that caused the disengage was unintentional (i.e. that the occupant was not paying attention), and thus, the computing devices 110 would provide the secondary disengage alert. This predetermined period of time may be stored in the memory 130, determined through testing, and adjusted as needed.

In some instances, despite having an additional control input and/or non-control input as described above, it may be very unlikely that the occupant would have intentionally disengaged. In such cases, even where there is a control input, the computing devices may provide the secondary disengage alert. For instance, if less than a predetermined period of time has elapsed since the autonomous driving mode was engaged (such as 5 seconds or more or less), it may be more likely that the disengage was unintentional. As such, in these situations, the computing devices 110 may provide the secondary disengage alert. This predetermined period of time may be stored in the memory 130, determined through testing, and adjusted as needed.

In some instances, the time at which the secondary disengage alert is provided may be adjusted. For instance, the secondary disengage alert may be provided a predetermined period of time after the transition from the autonomous driving mode. This period of time may be increased or decreased depending upon the circumstances, such as proximity to other vehicles, current speed of the vehicle and/or distance to certain objects as defined in the map information or detected by the perception system. For example, if the vehicle is farther from another vehicle, the period of time may be greater than if the vehicle is closer to another vehicle. As another example, when the vehicle is approaching a red traffic light or a crosswalk, at higher speeds, the period of time may be shorter than if the vehicle is approaching at lower speeds.

In some instances, should an occupant fail to respond to the secondary disengage alert within a specified duration, the computing devices 110 may reinstate the autonomous driving mode while the secondary disengage alert or some other alert continues.

In some instances, it may be useful to automatically suppress the secondary disengage alerts. For instance, while there are additional occupants in the vehicle who are not test drivers (such as paying customers) or an additional test driver. This information may be provided to the vehicle by the driver and/or occupants or a remote computing devices, for instance, as part of a message instructing the vehicle to pick up a passenger, may be determined by the computing devices 110 or another computing devices using feedback from internal sensing devices such as cameras, pressure sensors in seats, etc., or may be determined by the vehicle or a remote computing device using software configured to track the vehicle's current status and track an estimated numbers of occupants within the vehicle, for instance based on camera feedback, pressure sensor feedback, and/or feedback from a door status sensor indicating the number of times and duration of one or more doors of the vehicle being open. Alternatively, the secondary disengage alerts may be provided during, such times when there are multiple test drivers or paying customers. In other examples, the secondary disengage alerts may be suppressed, or alternatively provided, only during times when other occupants are exiting and/or entering the vehicle 100.

Disabling the secondary disengage alert may enable a specialized occupant, such as a test driver for the vehicle 100, to navigate complex situations (i.e. when also trying to pay attention to the other occupants) while automatically disabling the secondary alarm and preventing the other occupants from becoming uncomfortable hearing the secondary disengage alert. For instance, the secondary disengage alerts may be automatically turned off for a period of time, such as 30 seconds or more or less, each time a test driver in the vehicle speaks and there is another occupant in the vehicle.

The features described herein may allow a vehicle's computing devices to increase the chances that an occupant of the vehicle is paying attention and takes control of the vehicle when the vehicle switches from an autonomous driving mode to a semiautonomous or a manual driving mode. As noted above, while it is certainly possible to always provide a primary disengage alert and a secondary disengage alert in such instances, it may not always be helpful to the occupant and may even make a dangerous situation worse. In addition, the use of an additional, secondary disengage alert, which is of a different type and/or higher magnitude than the initial, primary disengage alert, may also allow for the use of a primary disengage alert that is less cognitive loading, and therefore less likely to cognitively overload an occupant of the vehicle. Due to the secondary disengage alert's more specific triggering criteria, the secondary disengage alerts can be made to be more alerting, mitigating the consequences of rare but important accidental disengages without risking the task overload that may occur if a primary disengage alert were as salient or alerting.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of providing disengage alerts to an occupant of a vehicle having autonomous and manual driving modes, the method comprising:
    while the vehicle is being controlled in the autonomous driving mode, receiving, by one or more processors, user input at one or more using input devices of the vehicle;
    in response to receiving the user input, transitioning, by the one or more processors, the vehicle from the autonomous driving mode to a manual driving mode and providing an audible primary disengage alert to the occupant of the vehicle regarding the transition;
    determining, by the one or more processors, whether the user input was intentional or unintentional based on whether there has been additional user input within a predetermined period of time from when the user input was received or when the transition occurred; and
    after the transition, providing, by the one or more processors, an audible secondary disengage alert to the occupant of the vehicle when it is determined that the user input was unintentional.

2. The method of claim 1, wherein the user input relates to a type of a user input device at which the user input was received.

3. The method of claim 2, wherein when the type of the user input device is a steering wheel, the determination of whether the user input was intentional or unintentional is based on at least whether the user input meets a predetermined torque threshold.

4. The method of claim 2, further comprising determining whether the user input meets a predetermined torque for at least a predetermined duration.

5. The method of claim 1, further comprising storing the predetermined period of time in a memory.

6. The method of claim 1, wherein the additional user input is a control input at one or more of a steering wheel, brake pedal, or accelerator of the vehicle.

7. The method of claim 1, wherein the additional user input is a non-control input at one or more user inputs of the vehicle other than a steering wheel, brake pedal, or accelerator of the vehicle.

8. The method of claim 1, wherein when there has been no control input at one or more of a steering wheel, brake pedal, or accelerator of the vehicle and no non-control input at one or more user inputs of the vehicle other than a steering wheel, brake pedal or accelerator of the vehicle within the period of time, determining that the user input was unintentional.

9. The method of claim 1, wherein when the additional input includes control input at one or more of a steering wheel, brake pedal or accelerator of the vehicle and no non-control input at one or more user inputs of the vehicle other than a steering wheel, brake pedal or accelerator of the vehicle, determining that the user input was unintentional.

10. The method of claim 1, wherein when the additional input includes control input at one or more of a steering wheel, brake pedal or accelerator of the vehicle and non-control input at one or more user inputs of the vehicle other than a steering wheel, brake pedal or accelerator of the vehicle, determining that the user input was intentional.

11. The method of claim 1, further comprising determining the period of time based on a current speed of the vehicle.

12. The method of claim 11, wherein when the current speed is a first speed, the period of time is less than when the current speed is a second speed less than the first speed.

13. The method of claim 1, wherein the determining whether the user input was intentional or unintentional is further based on whether a predetermined period of time has lapsed since the autonomous driving mode was engaged.

14. The method of claim 13, wherein when the predetermined period of time has lapsed since the autonomous driving mode was engaged, determining that the user input was unintentional.

15. The method of claim 1, wherein the determining whether the user input was intentional or unintentional is further based on whether a predetermined period of time has lapsed since non-control input was received at one or more user inputs of the vehicle other than a steering wheel, brake pedal or accelerator of the vehicle.

16. The method of claim 1, further comprising, disabling the audible secondary disengage alert based on whether there is a second occupant in the vehicle.

17. A system for providing disengage alerts to an occupant of a vehicle having autonomous and manual driving modes, the system comprising one or more processors configured to:
    while the vehicle is being controlled in the autonomous driving mode, receive user input at one or more using input devices of the vehicle;
    in response to receiving the user input, transition the vehicle from the autonomous driving mode to a manual driving mode and provide an audible primary disengage alert to the occupant of the vehicle regarding the transition;
    determine whether the user input was intentional or unintentional based on whether there has been additional user input within a predetermined period of time from when the user input was received or when the transition occurred; and
    after the transition, provide an audible secondary disengage alert to the occupant of the vehicle when it is determined that the user input was unintentional.

18. The system of claim 17, further comprising a memory, wherein the predetermined period of time is stored in the memory.

19. The system of claim 17, wherein the determination as to whether the user input was intentional or unintentional is further based on whether a predetermined period of time has lapsed since the autonomous driving mode was engaged.

20. The method of claim 2, wherein when the type of the user input device is a button that causes the vehicle to transition to the manual driving mode, the audible secondary disengage alert is not provided.

21. The method of claim 2, further comprising:
    when the type of the user input device is one of a brake pedal and accelerator, determining whether the user input meets a predetermined force threshold; and
    providing the audible secondary disengage alert when it is determined that user input is unintentional because the user input does not meet the predetermined force threshold.

22. The method of claim 1, wherein the audible secondary disengage alert is louder than the audible primary disengage alert.

23. The system of claim 17, wherein the audible secondary disengage alert is louder than the audible primary disengage alert.

24. The method of claim 1, further comprising:
    adjusting, by the one or more processors, the predetermined period of time based on a speed of the vehicle.

25. The system of claim 17, wherein the predetermined period of time is adjusted based on a speed of the vehicle.

* * * * *